UNITED STATES PATENT OFFICE.

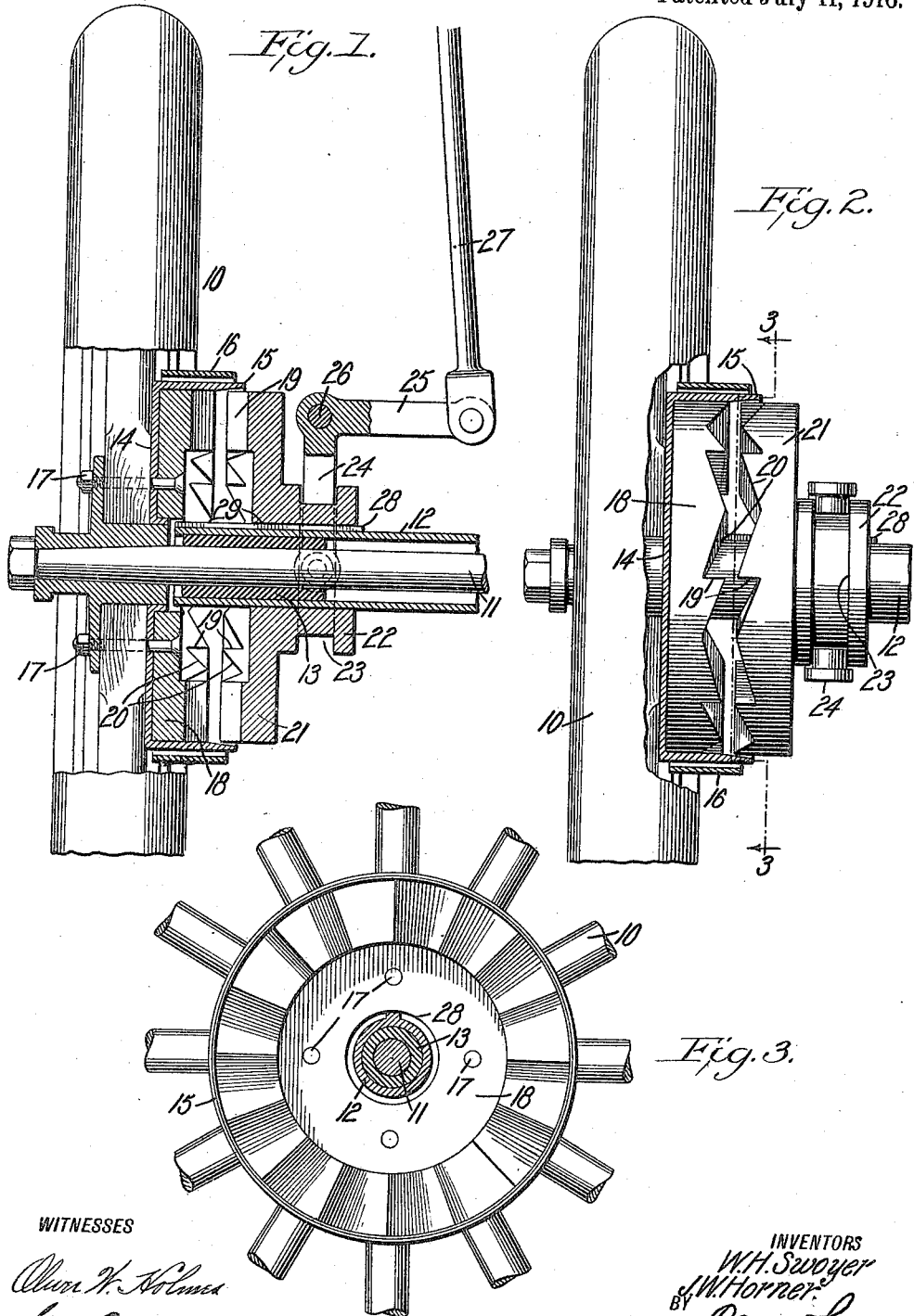

WILLIAM H. SWOYER AND JACOB W. HORNER, OF LINFIELD, PENNSYLVANIA.

SAFETY BRAKE CLUTCH AND LOCK.

1,190,811. Specification of Letters Patent. Patented July 11, 1916.

Application filed February 23, 1916. Serial No. 79,923.

*To all whom it may concern:*

Be it known that we, WILLIAM H. SWOYER and JACOB W. HORNER, citizens of the United States, and residents of Linfield, in the county of Montgomery and State of Pennsylvania, have invented a new and Improved Safety Brake Clutch and Lock, of which the following is a full, clear, and exact description.

This invention relates to safety appliances for wheeled vehicles and has particular reference to a positive brake attachment for a vehicle wheel.

Among the objects of the invention is to provide means, whereby in the event of the failure of the usual friction brake devices to avoid danger, we provide a positive stop coöperating with the brake or hub portion of the wheel, the same acting either independently of or auxiliary to the usual friction brake.

Another object of the invention is to combine with the usual band brake hub for a traction wheel, a toothed clutch, a portion of which is secured within the hub aforesaid, and the other portion of which is connected to the stationary axle casing and movable toward and from the fixed member of the clutch.

With the foregoing and other objects in view, the invention consists in the arrangement and combination of parts hereinafter described and claimed, and while the invention is not restricted to the exact details of construction disclosed herein, still for the purpose of illustrating a practical embodiment thereof reference is had to the accompanying drawings, in which like reference characters designate the same parts in the several views, and in which—

Figure 1 is a vertical longitudinal central section of the hub portion of a vehicle wheel and brake appliance, a driving axle being shown in elevation and the axle casing in longitudinal section; Fig. 2 is a similar view but indicating the clutch members in elevation; and Fig. 3 is a side elevation of the inner face of the wheel hub and clutch member secured therein, parts being in section substantially on the broken line 3—3 of Fig. 2 and the brake strap being omitted.

Referring now more particularly to the drawings we show a wheel which may be regarded for purposes of illustration as a standard automobile wheel 10 secured to the driving axle 11 journaled for rotation within the stationary axle casing 12, a bearing bushing 13 being arranged between the axle and the casing.

On the inner side of the hub is secured a brake drum comprising a disk-like web 14 and an inwardly projecting cylindrical friction flange 15 upon which the usual friction brake strap 16 is adapted to operate. The drum is secured rigidly to the wheel by bolts 17 or their equivalent.

Within the drum is secured rigidly, and by means of the aforesaid bolts 17, a toothed clutch member 18 having teeth formed with faces 19 arranged in planes radial to the wheel and other faces 20 inclined to such planes. We prefer to arrange these faces in opposite directions irrespective of the direction of movement of the wheel. This clutch member 18 will thus be seen to be fixed rigidly to the wheel and rotates therewith but otherwise is immovable. The flange 15 of the drum projects inwardly to a material distance beyond the edges of the teeth of the member 18.

At 21 we provide another clutch member complemental in form and size to the member 18 and having its teeth projecting outwardly. This clutch member also is provided with a collar 22 having a circumferential groove 23 formed around it in which operates the yoke 24 of a bell crank 25 pivoted at 26 at one side of or above the axle. The bell crank is controlled in its positions relatively to the pivot 26 by means of a link or rod 27 adapted to be manipulated by hand or foot power in any suitable manner, the normal position, however, being that shown in Fig. 1 and in which the clutch member 21 is held free from the other member of the clutch.

The clutch member 21 is slidable on the axle casing 12 toward and away from the clutch member carried by the hub, but is held from rotation by means of a spline or feather 28 projecting into a groove 29 formed in the hub or collar portion of the slidable clutch member. The teeth of the slidable clutch member always lie within the rim of the flange 15, the same being flared somewhat on its inner surface to insure proper and prompt engagement between the two clutch members when force is applied to the yoke serving to cause the teeth of the two clutch members to interlock.

Under usual conditions the braking of the vehicle will be accomplished by the application of the strap 16 to the external surface of the brake drum, but as already set forth, in the case of emergency as, for instance, the usual strap brake failing or being defective, which is practically a failure, the operator will throw the slidable clutch member 21 so as to make it interlock with the teeth of the other clutch member, and since the clutch member 21 is held positively from rotation, the wheel will be positively checked in its rotation.

We claim:

In a safety brake for traction vehicles, the combination with a driving axle, a wheel secured thereto, a brake drum secured to the wheel and having a flange extending inwardly therefrom, a toothed clutch member secured within the drum flange and having teeth spaced inwardly from the rim of the flange, and a stationary axle casing in which the driving axle is journaled, of a clutch member secured slidably upon the axle casing and movable toward and from the other clutch member, the slidable clutch member having teeth complemental to and adapted to interlock with the teeth of the first mentioned clutch member, means to prevent rotation of the latter mentioned clutch member, and means to control the position of the slidable clutch member holding it either out of engagement or in locking engagement with the first mentioned clutch member, the teeth of the slidable clutch member always lying within the projecting flange of the brake drum.

WILLIAM H. SWOYER.
JACOB W. HORNER.

Witnesses:
HARVEY CHRISTMAN,
WILLIS CRATER.

Copies of this patent may be obtained for five cents each, by addressing the "Commissioner of Patents, Washington, D. C."